US006662694B2

(12) United States Patent
Rankin, Sr.

(10) Patent No.: US 6,662,694 B2
(45) Date of Patent: Dec. 16, 2003

(54) ROTATABLE CUTTING TOOL WITH COLORED VISUAL WARNING

(76) Inventor: David Daniel Rankin, Sr., 602 S. Eastway Dr., Troutman, NC (US) 28166

( * ) Notice: Subject to any disclaimer, the term of this patent is extended or adjusted under 35 U.S.C. 154(b) by 6 days.

(21) Appl. No.: 10/106,594

(22) Filed: Mar. 26, 2002

(65) Prior Publication Data
US 2003/0183051 A1 Oct. 2, 2003

(51) Int. Cl.[7] .............. B26D 3/00; B26D 1/12; B23D 45/00; G01D 13/12
(52) U.S. Cl. .............. 83/13; 83/676; 83/835; 83/DIG. 1; 116/298
(58) Field of Search .............. 83/DIG. 1, 13, 83/835–855, 676; 116/DIG. 41, 298, 200, 208

(56) References Cited

U.S. PATENT DOCUMENTS

| | | |
|---|---|---|
| 537,887 A | 4/1895 | Bradley |
| 838,305 A | 12/1906 | Curial |
| 1,532,548 A | 4/1925 | Ramsey |
| 2,631,405 A | 3/1953 | Masten |
| 2,701,540 A | 2/1955 | Hamilton |
| 3,430,605 A | 3/1969 | Wood |
| 3,575,128 A | 4/1971 | Pool et al. |
| 3,575,129 A | 4/1971 | Sullivan |
| 3,654,553 A | 4/1972 | Mary et al. |
| 3,752,113 A | 8/1973 | Blechman |
| 4,026,042 A | 5/1977 | Ames |
| 4,099,480 A | 7/1978 | Loustaunau |
| 4,121,851 A | 10/1978 | Finkenbiner |
| 4,345,540 A | 8/1982 | Karmin |
| 4,869,302 A | 9/1989 | Robson |
| 4,904,130 A * | 2/1990 | Gorman ............ 408/16 |
| 5,105,308 A | 4/1992 | Holley et al. |
| 5,221,186 A * | 6/1993 | Machin ............ 416/61 |
| 5,224,830 A | 7/1993 | Wang |
| 5,239,396 A | 8/1993 | Thompson |
| 5,316,061 A * | 5/1994 | Lee ............ 144/218 |
| 6,048,068 A | 4/2000 | Broten |
| 6,067,888 A * | 5/2000 | Achterberg et al. ........ 83/835 |
| 6,158,323 A * | 12/2000 | Asada ............ 83/835 |

* cited by examiner

Primary Examiner—Allan N. Shoap
Assistant Examiner—Isaac N Hamilton
(74) Attorney, Agent, or Firm—Alston & Bird LLP

(57) ABSTRACT

A rotatable cutting tool with colored visual warning is provided. The cutting tool includes colored portions of at least two different colors. When the cutting tool is rotated above a predetermined speed, the individual colors are not separately discernable but instead appear as an apparent or blended color which serves as a visual warning.

27 Claims, 5 Drawing Sheets

ROTATABLE CUTTING TOOL WITH COLORED VISUAL WARNING

BACKGROUND OF THE INVENTION

The present invention relates to rotatable cutting tools and, more specifically, to visual warnings for indicating that rotatable cutting tools are operating.

Rotatable cutting tools are well known and include, among others, saw blades, cutterheads or chucks, or the like, with insertable blades, drill bits, router bits, and the like. These tools are used for cutting a variety of solid materials, and often at least part of the cutting tool is exposed and creates a potential hazard during cutting operations. Operators or others near the cutting tool may not take notice of the cutting tool and may not easily recognize that the cutting tool is rotating. This can result in property damage and injuries to humans.

Lights or sounds are often used as warning mechanisms to reduce the risk of inadvertent contact with the sharp cutting edges of rotating cutting tools. However, due in part to the busy or noisy environment where cutting tools are used, these warning mechanisms may be insufficient to avert accidents. One critical reason for their insufficiency is that they can be characterized as not being in sufficiently close association with the sharp edges of the cutting tools. This deficiency can become more critical in a shop where multiple cutting tools are in use, because workers may be contemporaneously exposed to warning lights and noises that are loosely associated with several machines. Worker complacency and fatigue may also increase the danger. Even under good environmental conditions, in a clean and quiet atmosphere, accidents involving cutting tools are virtually inevitable.

Thus, there exists a need for a visual warning that provides an improved indication of whether a cutting tool is rotating or stopped.

SUMMARY OF THE INVENTION

In accordance with one aspect of the present invention, a visual warning is provided that is in sufficiently close association with sharp edge(s) of a cutting tool, preferably by being on the cutting tool in close proximity to the sharp edges, so that the visual warning seeks to unambiguously indicate to someone in close proximity to the cutting tool whether the cutting tool is moving, and most preferably whether the cutting tool is rotating. In accordance with this aspect, multiple different colors are positioned on different portions of the surface of the cutting tool, and the portions are arranged such that they follow the same path when the cutting tool is rotated. When the cutting tool is stationary, the colors are separately discemable, but when the tool is rotated at a sufficient speed, the colors appear to blend to form a different, apparent color, which preferably serves as an annular, monochromatic, visual warning. Optionally, multiple of such visuals warnings, which are similarly or differently colored, can be provided on a single cutting tool.

In accordance with one aspect of the present invention, the colors of the colored portions are selected from a group consisting of primary colors. In accordance with a specific example of this aspect, the colors of the colored portions consist essentially of red and yellow, so that the apparent color is orange.

According to one aspect of the present invention, the cutting tool has a recess on its surface and the colors are disposed at least partially in the recess. By virtue of the recess, the colors can be flush with the surface or recessed with respect to the surface, so that the colors are not exposed to the harshest conditions that are in the vicinity of the operating cutting edge(s) of the cutting tool. For example, the colors avoid some of the physical abrasion that occurs between the cutting tool and the solid material that is cut by the cutting tool. This advantageously allows the colors to be at least somewhat protected while being in close proximity to the cutting edge(s), where the colors advantageously function as a visual warning that is closely associated with the danger that is intended to be avoided. That is, in accordance with this aspect, the recess preferably serves to allow the colors to be positioned in a location that is at least partially protected from substances that are proximate the one or more cutting edges of the tool and might have a tendency to remove the colors. This advantageously allows the colors to be positioned in close proximity to the cutting edges, which is where the colors will most effectively function as a visual warning in some scenarios.

In accordance with one aspect of the present invention, the differently colored portions of the cutting tool, which serve as the visual warning when the tool is rotated above a predetermined speed, are positioned radially outward from a shaft that is rotated by a motor and to which the cutting tool is mounted. This seeks to advantageously ensure that the visual warning is in sufficiently close proximity to cutting edge(s) so that the operating cutting edge(s) do not go unnoticed.

In accordance with one aspect of the present invention, at least one of the colored portions includes indicia that moves along the path of the visual warning while the cutting tool is rotated. The indicia is readily discernable while the cutting tool is not rotated, and the indicia is not readily discernable while the cutting tool is rotated at greater than the predetermined speed. Accordingly, the indicia can provide an enhanced indication that the cutting tool is not rotating.

Thus, the present invention provides a cutting tool with an improved visual warning that primarily becomes apparent when the tool is being operated and that is preferably in close proximity to one or more cutting edges of the tool.

BRIEF DESCRIPTION OF THE DRAWINGS

Figure 1:
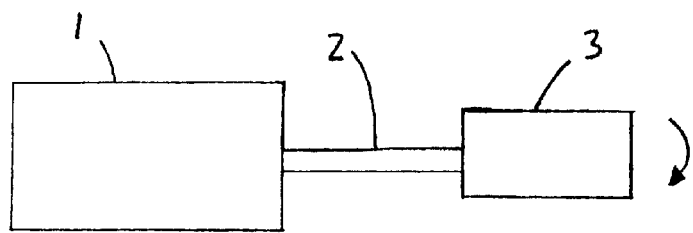
Figure 2:
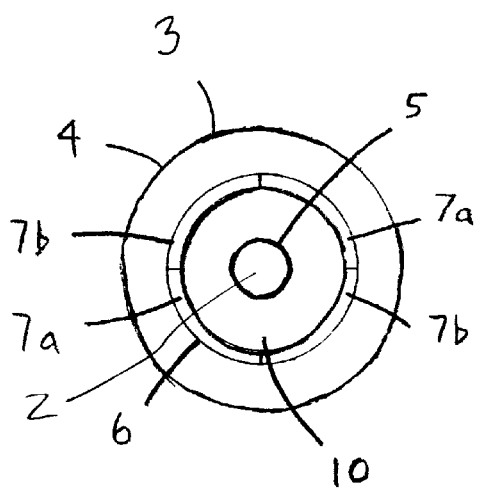
Figure 3:
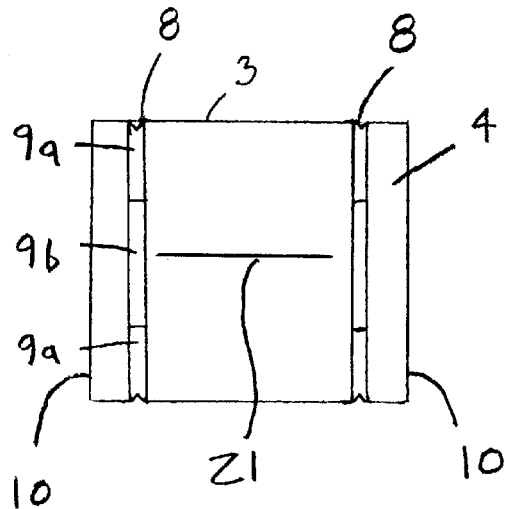
Figure 4:
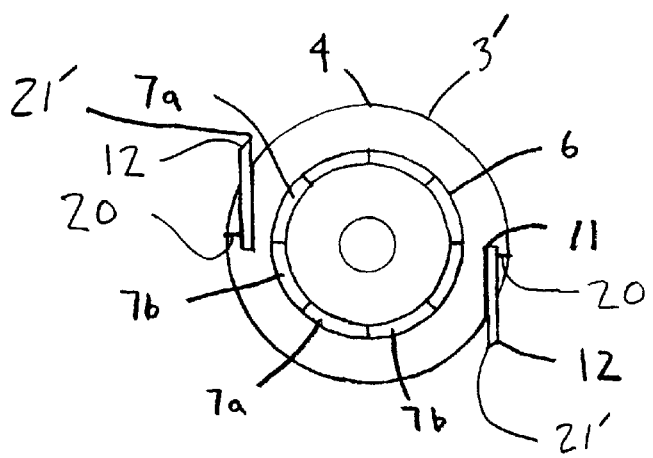
Figure 5:
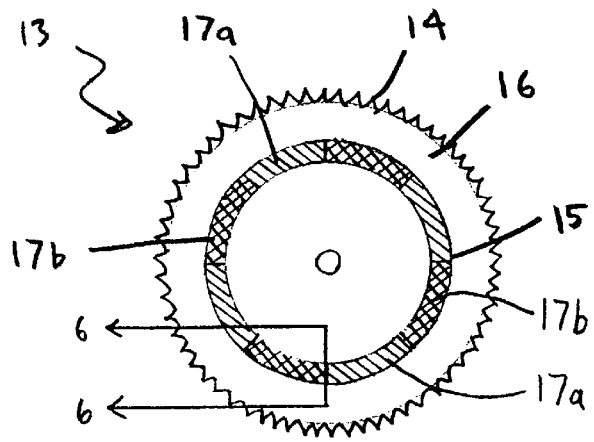
Figure 6:
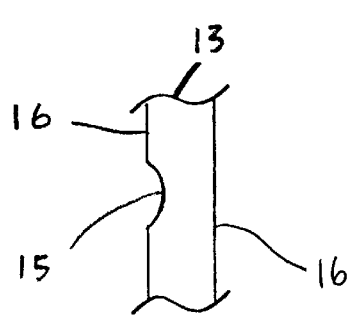
Figure 7:
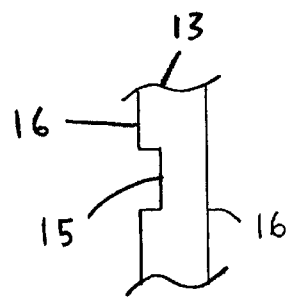
Figure 8:
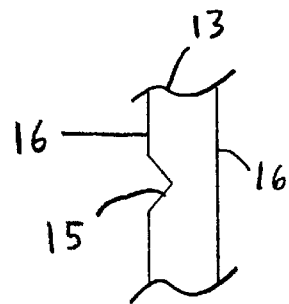
Figure 9:
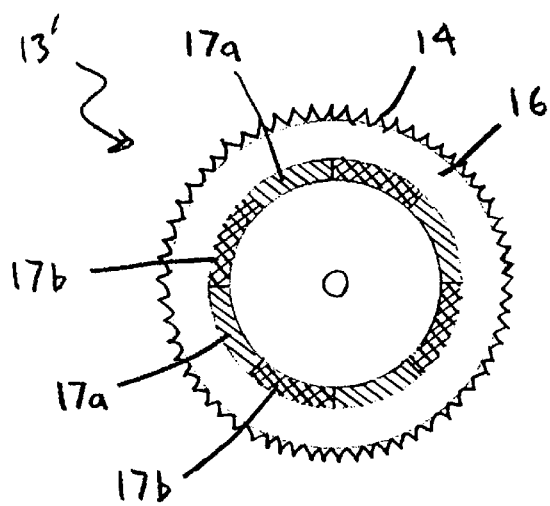
Figure 10:
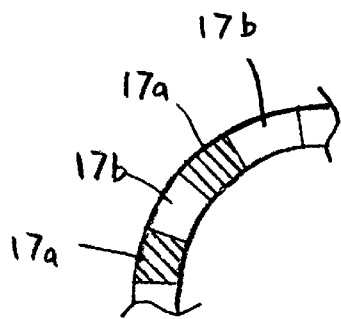
Figure 11:
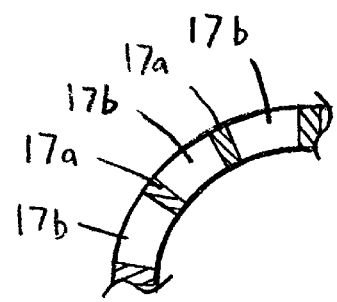
Figure 13:
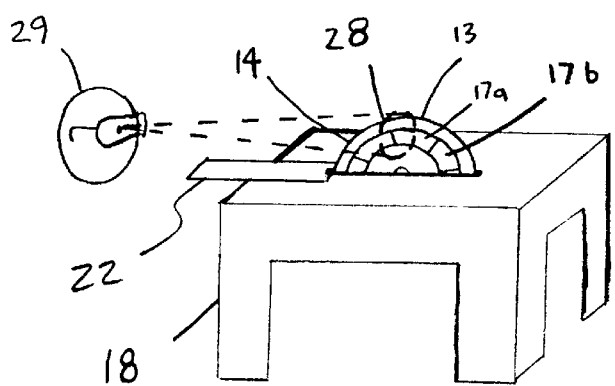
Figure 12:
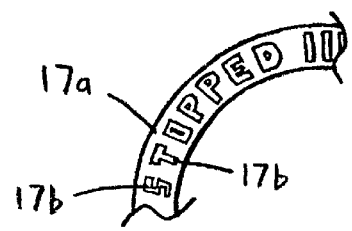
Figure 14:
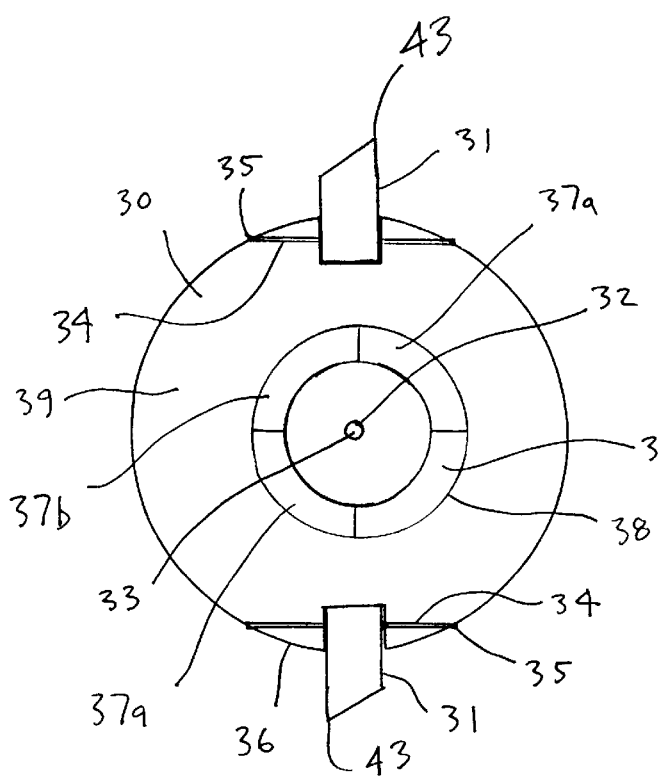
Figure 15:
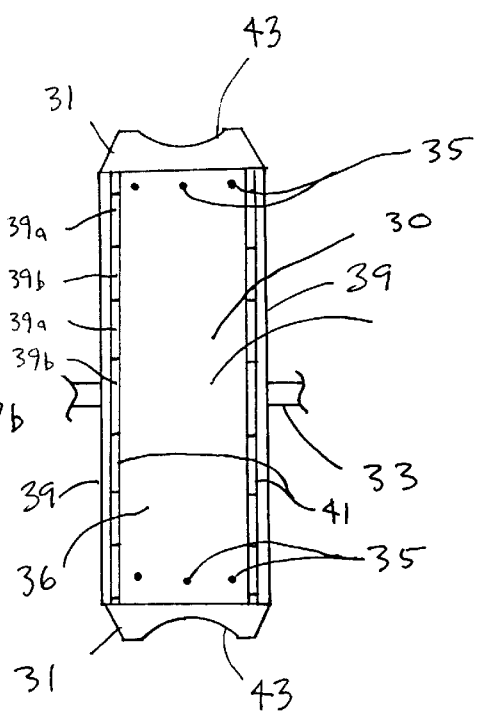
Figure 16:
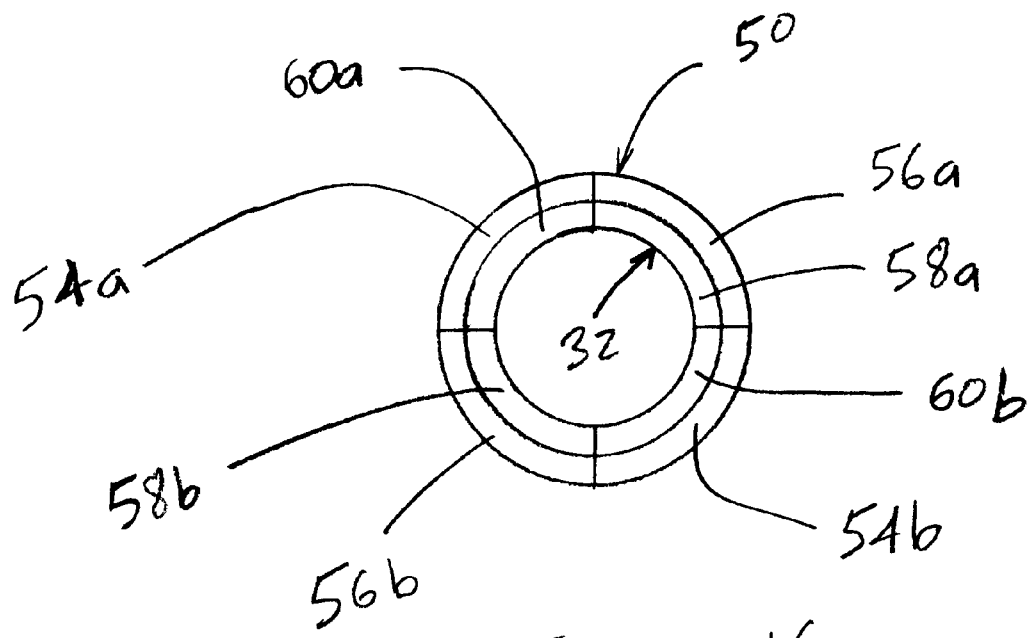
Figure 17:
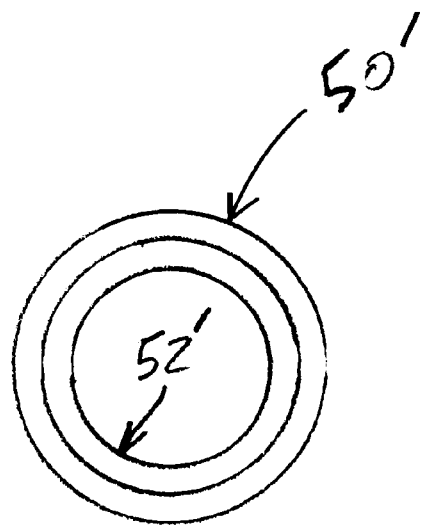

Having thus described the invention in general terms, reference will now be made to the accompanying drawings, which are not necessarily drawn to scale, and wherein:

FIG. 1 is a diagrammatic assembly drawing of a cutting machine according to an exemplary embodiment of the present invention;

FIG. 2 is a diagrammatic, end elevation view of a generally cylindrical cutting head of FIG. 1;

FIG. 3 is a diagrammatic and representative side view of the cutting head of FIG. 2;

FIG. 4 is a diagrammatic, end elevation view of a generally cylindrical cutting head with insertable blades, in accordance with another embodiment of the present invention;

FIG. 5 is a diagrammatic elevation view of a circular saw blade according to another embodiment of the present invention;

FIG. 6 is a partial section view of the circular saw blade of FIG. 5 with a curved recess, as seen from line 6—6;

FIG. 7 is a partial section view of a circular saw blade with a rectangular recess;

FIG. 8 is a partial section view of a circular saw blade with a triangular recess;

FIG. 9 is an elevation view of a circular saw blade according to another embodiment of the present invention;

FIG. 10 is a partial view of a multi-colored non-warning ring with colored portions of equal sizes;

FIG. 11 is a partial view of a multi-colored non-warning ring with colored portions of unequal sizes;

FIG. 12 is a partial view of a colored ring with colored portions in the shape of text;

FIG. 13 is a perspective view of a table saw and an operator in accordance with an embodiment of the present invention;

FIG. 14 is a diagrammatic end, elevation view of a cutterhead according to an embodiment of the present invention;

FIG. 15 is a diagrammatic side view of the cutterhead of FIG. 14;

FIG. 16 illustrates two closely associated multi-colored non-warning rings, in accordance with another embodiment of the present invention; and FIG. 17 illustrates the two multi-colored non-warning rings being rotated at above a predetermined speed, so that they appear to be two monochromatic warning rings.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 diagrammatically illustrates a cutting machine such as, but not limited to, a molding machine, or the like, according to an exemplary embodiment of the present invention. A motor 1 is attached by a drive shaft 2 to a generally cylindrical cutting head 3. An arrow indicates that the cutting head 3 rotates about an axis that it shares with the drive shaft 2. Although the cutting tool shown in FIG. 1 is a cutting head 3, other cutting tools may similarly be used in this configuration. For example, the cutting tool could be a circular saw blade, a drill bit, a router bit, or other types of cutting tools or portions thereof, and the cutting head identified by the numeral 3 in FIG. 1 is considered to be a generic cutting tool that is diagrammatically illustrative of these other types of cutting tools or portions thereof.

As diagrammatically shown in FIG. 2, the cutting head 3 has a mounting hole 5 by which it is attached to the drive shaft 2. As one example that is shown in FIG. 2, the cutting head 3 is attached to the drive shaft 2 by virtue of the drive shaft extending into the hole 5. One or more sharp cutting edges 21 (diagrammatically shown in FIG. 3) are on or extend from the outer surface 4 of the cutting head 3. In a first embodiment of the present invention, the cutting head 3 is shown with several recesses 6, 8 in FIGS. 2 and 3. Cutting edge recesses 8 are formed in the circumferential outer surface 4 of the cutting head 3, and they preferably encircle the cutting head 3. Lateral recesses 6 are located on opposite ends 10 of the cutting head 3. The recesses 6 and 8 are preferably annular.

Within each recess 6, 8 there are respectively designated several colored portions 7a, 7b, 9a, 9b that preferably form what can be characterized as non-warning colored rings, which each preferably become a monochromatic warning ring when the cutting head 3 is rotated, as will be discussed in greater detail below. A first color is used in first-colored portions 7a, 9a, and a second color is used in second-colored portions 7b, 9b. Thus, first and second colors alternate sequentially around the recesses 6, 8. The colors may be disposed on the colored portions 7a, 7b, 9a, 9b by any known means including the application of paint, ink, or other chemicals. An optional clear protective coating is disposed over the colored portions 7a, 7b, 9a, 9b.

As shown in FIG. 2, each lateral recess 6 includes four equally sized colored portions 7a, 7b. In other examples of the present invention, other numbers of colored portions 7a, 7b may be used, and the colored portions 7a, 7b may or may not be equally sized. As the cutting head 3 rotates about an axis collinear with the center axis of the mounting hole 5, the colored portions 7a, 7b will follow at least similar paths, with these paths being identical for the embodiment of FIGS. 1–3. Thus, as the cutting head 3 rotates slowly, a person viewing an area occupied by the recess 6 will alternatively see the first and second colors. The speed at which the first and second colors alternate will depend on the number of colored portions 7a, 7b and the rotational speed of the cutting head 3. For example, if the recess 6 has four colored portions 7a, 7b as shown in FIG. 2 and the cutting head 3 rotates at 1000 revolutions per minute, then each of the first and second colors will appear 2000 times per minute in a viewing area occupied by the recess 6. Thus, in the field of view of a person viewing an area occupied by the recess 6 there would be 4000 alternations between the two colors per minute.

To the human eye, colors that alternate at a sufficient frequency appear to blend to form a different color referred to hereinafter as an "apparent" color; the eye does not perceive the individual colors but instead perceives the apparent color. For example, if a person observes red and yellow indicators that alternate at sufficient frequency, the person will not perceive the red and yellow colors individually but rather will perceive the apparent color of orange; Thus, if the colored portions 7a are red and the colored portions 7b are yellow, a person viewing an area occupied by the colored portions 7a, 7b as the cutting head 3 rotates at a predetermined speed, or greater, will see the apparent color orange formed by the "blending" of the red and yellow. Stated generally, in accordance with one aspect of the present invention, when multi-colored non-warning rings are rotated at greater than a predetermined speed, they respectively become monochromatic warning rings. Many other pairs of colors can be used for the colored portions 7a, 7b to form other apparent colors. For example, the colored portions 7a, 7b respectively could be yellow and blue, to form the apparent color of green.

As shown in FIG. 3, the recesses 8 of the cutting head 3 have alternating colored portions 9a, 9b. The colored portions 9a, 9b function like the colored portions 7a, 7b in the lateral edge recesses 6. Thus, the first color, which is disposed on first-colored portions 9a, and the second color, which is disposed on second-colored portions 9b, are separately discernable when the cutting head 3 is stationary, preferably to form a multi-colored non-warning ring. When the cutting head 3 is rotated above a predetermined speed, the first and second colors appear to blend to form a new, apparent color that is preferably in the form of a monochromatic warning ring.

The blending of the first and second colors provides a means of warning for a person observing the cutting head 3.

It is sometimes difficult to tell if a conventional cutting head 3 is stationary or rotating. In contrast, the present invention provides a ready indication: if the first and second colors are discernable, then the cutting head 3 is stopped. Alternatively, if the first and second colors are not discernable, and instead there appears an apparent or blended color, then the cutting head 3 is rotating.

In this embodiment, first and second colors are disposed on the cutting head 3. However, in other embodiments, three or more colors may be used. Three or more colors may be disposed in different colored portions 7a, 7b, 9a, 9b of a single recess 6. Also, while the colored portions 7a, 7b on the opposite ends 10 of the cutting head 3 shown in FIG. 2 are disposed in a single path, the colored portions 7a, 7b may alternatively define more than once path. For example, multiple concentric circular recesses 6 may be formed on one or both of the ends 10. Additionally, the colors disposed in the colored portions 7a, 7b, 9a, 9b of one recess 6, 8 may differ from the colors disposed in the colored portions 7a, 7b, 9a, 9b of another recess 6, 8. Thus, different apparent colors may appear when the cutting head 3 rotates.

FIG. 4 diagrammatically shows a cutting head 3' according to another embodiment of the present invention. The cutting head 3' has a recess 6 that is divided into eight colored portions 7a, 7b instead of four as in FIG. 2. Thus, if two colors are alternatively disposed in the eight portions 7a, 7b, the frequency of alternation of the first and second colors will be double that of the cutting head 3' shown in FIG. 2 when rotated at the same speed.

The cutting head 3' of FIG. 4 includes a cutterhead that has two or more slots 11 into which blades 12 are respectively inserted. The blades 12 in this embodiment preferably extend between the ends 10 and preferably are as long as the cutting head 3'. The blades 12 are secured in place by fasteners such as set screws 20, or the like. During operation, the cutting head 3 is rotated and cutting edges 21' of the blades 12 are brought into contact with a material that is to be cut. The blades 12 may be removed and changed to best suit the structural material that is being cut, and the blades 12 may be removed for replacement or sharpening after use. The blades 12 may define a variety of different shapes and profiles designed to impart a contour or profile onto the structural material.

FIG. 5 shows another type of cutting tool, specifically a circular saw blade 13. The circular saw blade 13 is in some ways generally similar to the cutting head 3 of FIG. 2, but is thinner in width. Circular saw blades 13 are used for various purposes, most commonly for the cutting of wood and wood-like structural materials. The circular saw blade 13 has a cutting edge 14 and opposite sides 16 (also see FIGS. 6–8). In this embodiment, there is a recess 15 on at least one side 16 of the circular saw blade 13. The recess 15 is divided into a number of first colored portions 17a and second colored portions 17b defined by the disposition of alternating colors in the recess 15. For illustrative purposes, in some of the figures different colors are represented by different types of "hatching" symbols.

In each of the foregoing embodiments, the recesses 6, 8, 15 can have various cross-sectional shapes, some of which can be seen in FIGS. 6, 7 and 8. By way of example, FIG. 6 shows a partial sectional view of the circular saw blade 13. The recess 15 has a curved cross-section. FIGS. 7 and 8 show other circular saw blades 13 with recesses 15 of rectangular and triangular cross-section respectively. Although the recesses 15 are shown on only one side 16 of the circular saw blade 13, the recesses may alternatively be located on both sides 16 at the same or different radial positions.

For each of the embodiments of the present invention in which the colored rings are described as preferably being defined by colored portions within recesses, there is an alternative embodiment that is identical, except that the recesses are not present, such that the colored rings are formed on a non-recessed surface. Also, it is also within the scope of the present invention for the ring-like nature of the colored rings not to be apparent until the cutting tool is rotated. FIG. 9 diagrammatically illustrates a circular saw blade 13' according to one of these alternative embodiments, because the colored portions 17a, 17b are located on the non-recessed side 16 of the circular saw blade 13' and are located proximate to the cutting edge 14.

FIG. 13 shows a cutting machine, which is, for example, a table saw 18, but that could also be a molding machine or another type of cutting machine. The table saw 18 includes the circular saw blade 13 that is shown in isolation in FIG. 5. An operator 29 is located at a position from which the operator 29 can operate the cutting machine, such as by introducing a solid material 22 into the cutting machine so that the cutting edge 14 engages and cuts the solid material, preferably while the rotational axis of the saw blade 13 remains stationary. Dashed lines diagrammatically indicate a line of sight from the operator 29 towards the circular saw blade 13 and a particular area 28 within the field of view of the operator 29. In this case, the operator 29 cannot simultaneously view all of the colored portions 17a, 17b because some of the colored portions 17a, 17b are concealed by the table of the table saw 18. However, at least once during each rotation of the circular saw blade 13, the cutting edge 14 and at least one of each of the colored portions 17a, 17b are within the area 28 that lies within the field of view of the operator 29. Thus, the operator 29 can see the visual warning of the apparent color while simultaneously viewing the cutting edge 14. The proximity of the colored portions 17a, 17b to the cutting edge 14 advantageously increases the likelihood that the operator 29 will take notice of the visual warning before touching or causing undesired contact with the circular saw blade 13.

As noted in the discussion of FIGS. 2 and 3, the colored portions 7a, 7b, 9a, and 9b on the cutting head 3 may be equally sized or unequally sized. Similarly, the colored portions 17a, 17b on the circular saw blade 13 may be equally sized or unequally sized. This is true regardless of whether the portions 7a, 7b, 9a, 9b, 17a, 17b are located in one of the recesses 6, 8, 15 or on a non-recessed surface. By way of illustration, FIG. 10 shows a partial view of a colored ring including the colored portions 17a, 17b, wherein the colored portions 17a, 17b are equally sized. Alternatively, in FIG. 11, which is another partial view of a colored ring, the colored portions 17a, 17b are unequally sized, and specifically the first colored portions 17a defined by the first color are smaller than the second colored portions 17b defined by the second color. The relative sizes of the colored portions 17a, 17b influence the apparent color that is formed during rotation. For example, if the first colored portions 17a are yellow and the second colored portions 17b are red, increasing the relative sizes of the second colored portions 17b causes the apparent color of orange to become darker, or more red-like. Therefore, the sizes of the colored portions 17a, 17b are designed with consideration given to the colors that are used and the apparent color that is desired.

In another embodiment, some of the colored portions 7a, 7b, 9a, 9b, 17a, 17b are defined by, or include, shapes in the form of indicia, with indicia being inclusive of text alphanumeric markings, symbols, and the like. For example, FIG. 12 illustrates a portion of a colored ring with second colored portions 17b that are in the form of text, with the first colored portion 17a serving as a color-contrasting background. Because the first and second colors defining the colored portions 17a, 17b are separately discernable when the cutting tool is stopped, the text formed by the colored portions 17b can be read when the cutting tool is at rest or moving very slowly. However, when the cutting tool is rotated at more than the predetermined speed, the text cannot be read. Therefore, the text formed by the colored portions 17b serves two distinct visual warnings. First, an observer can tell if the cutting tool is stopped or rotating by determining if the text can be read. In other words, the observer can recognize that the cutting tool is in motion simply by noticing that the text cannot be discerned, or recognize that the tool is stopped if the text is discernable. Second, the differently colored portions 17a, 17b provide a monochromatic visual warning in the manner described above, when the cutting tool is rotated at greater than the predetermined speed. In accordance with one example, a non-warning colored ring includes the text "HEAD IS STOPPED/SAFE TO REMOVE" once in red and once in yellow, with the red and yellow text spaced apart from one another so as to be clearly visible and readable when the cutting tool is stopped, and this text forming a monochromatic visual warning ring when the cutting tool is rotated above the predetermined speed. As another example, the color of one of the colored portions 7a in FIG. 2 defines the text quoted in the immediately preceding sentence, and the color of one of the colored portions 7b in FIG. 2 also defines the text quoted in the immediately preceding sentence, so that the text quoted in the immediately preceding sentence appears at least twice and in completely spaced apart locations in the same multi-colored non-warning ring.

Although the cutting tools of FIGS. 5–13 are circular saw blades, those of ordinary skill in the art will appreciate that the features and operations described with reference to these figures have applicability to other cutting tools and cutting machines, such as, but not limited to, molding machines. Those of ordinary skill in the art are familiar with molding machines, and U.S. Pat. No. 4,869,302, which describes a molding machine, is incorporated herein by reference. Accordingly, the cutting head 3' of FIG. 4 can be characterized as a cutterhead which mounts blades and is for use with a molding machine.

A cutterhead 30 for use with a molding machine is described more specifically with reference to FIGS. 14 and 15, in accordance with another embodiment of the present invention. The cutterhead 30 is a generally cylindrical shaped tool that includes two opposite ends 39, an outer surface 36, and a mounting hole 32 by which the cutterhead 30 is attached to a shaft 33. The shaft 33 is connected to a rotating device such as a motor (for example see the motor 1 of FIG. 1) which rotates the cutterhead 30. The cutterhead 30 preferably mounts one, two or more cutterhead inserts 31 (e.g., cutter blades) that fit into slots of the cutterhead and extend from the outer surface 36 of the cutterhead 30. The cutterhead inserts 31 are removably attached to the head 30 and held in place with fasteners, such as set screws 35, that are retained in threaded set screw holes 34. As the cutterhead 30 is rotated, a solid material is brought into contact with the rotating cutterhead inserts 31 and the solid material is cut by the cutterhead inserts 31. As shown in FIG. 15, the cutterhead inserts 31 each include a sharp cutting edge 43, which can be contoured so as to impart a design or profile on the solid material being cut. The cutterhead inserts 31 can be replaced. Thus, a variety of cutterhead inserts 31 can be used to achieve different shapes in the materials that are cut.

The cutterhead 30 preferably defines lateral recesses 38 in the end 39 and outer recesses 41 in the outer surface 36. The lateral recesses 38 include first colored portions 37a and second colored portions 37b. Similarly, the end recesses 41 include third and fourth colored portions 39a, 39b. Each of the colored portions 37a, 37b, 39a, 39b is chosen so that the first and second colored portions 37a, 37b and the third and fourth colored portions 39a, 39b are preferably part of respective multi-colored non-warning rings, which respectively visually blend when the cutterhead 30 rotates above a predetermined speed, so as to form apparent colors. As in the other embodiments of the invention, the apparent colors on the cutterhead 30 are preferably in the form of monochromatic rings that serve as visual warnings that the cutterhead is rotating.

As alluded to above, it is in accordance with the present invention for each of the above-discussed multi-colored non-warning rings to be in the form of two or more multi-colored non-warning rings that are preferably concentric and in close proximity to one another. For example, FIG. 16 illustrates a pair of multi-colored non-warning rings that can be used in place of above-discussed multi-colored non-warning rings. As illustrated in FIG. 16, an outer multi-colored non-warning ring 50 is concentric with and contiguous with an inner multi-colored non-warning ring 52. In one example, the outer ring 50 includes similarly colored portions 54a and 54b that are a different color from similarly colored portions 56a and 56b. Likewise, the inner ring 52 includes similarly colored portions 58a and 58b which are a different color from similarly colored color portions 60a and 60b. FIG. 17 illustrates the rings 50 and 52 of FIG. 16 being rotated at above a predetermined speed. FIG. 17 diagrammatically illustrates that the colored portions of the rings 50 and 52 are selected so that as these rings are rotated at above the predetermined speed, they form apparent colors such that the outer ring becomes a monochromatic warning ring 50' and the inner ring becomes a monochromatic warning ring 52' that is a different color from the outer warning ring 50'. Preferably the non-warning rings 50 and 52 respectively "convert" into the warning rings 50' and 52' at the same rotational speed.

In accordance with one example of the embodiment illustrated by FIGS. 16–17, the colored portions 54a, 54b, 58a, and 58b are yellow; the colored portions 56a and 56b are red; and the colored portions 60a and 60b are blue. Therefore, the outer warning ring 50' is orange and the inner warning ring 52' is green. Alternatively, the colors can be respectively reversed so that the outer warning ring 50' is green and the inner warning ring 52' is orange.

In accordance with one example applicable to all of the above-mentioned embodiments and examples, the colors of the colored portions are selected from a group consisting of primary colors. Generally described, any three colors that can be mixed in different combinations to produce nearly every other color are known as primary colors, and when primary colors are mixed in pairs, the resulting colors can be called secondary colors. As one example, a common group of primary colors consists of red, yellow and blue. Accordingly, whereas it has been explicitly mentioned herein that orange can be formed by a combination of red and yellow, and that green can be formed by a combination of yellow and blue, it is also within the scope of the present invention for purple to be formed by combining blue and red, and for other colors to be combined to form still other colors.

In accordance with one example of the present invention that is applicable to all of the above-described embodiments and examples, the predetermined rotational speed at which a multi-colored non-warning ring "converts" to a generally monochromatic warning ring is at least about 50 revolutions per minute, and preferably the generally monochromatic warning ring is visible in the range of about 1,750 to about 15,000 revolutions per minute.

Although the present invention has thus far been described primarily in the context of cutting tools, the multi-colored non-warning rings and the resulting monochromatic warning rings, with or without the respective recesses, can be formed on many other articles for which it would be useful to determine whether they are rotating, such as, but not limited to, grinders and other equipment. For example, each of the above-described cutting tools could be modified so as to maintain their same general shape but to be in the form of grinders or other equipment, with the multi-colored non-warning rings and the resulting monochromatic warning rings remaining generally as described above, and remaining proximate the portions of the grinders or other equipment that impose a danger that warrants usage of a visual warning.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A cutting tool that is rotated to cut material, comprising:
   structure connected to and supporting at least one cutting edge, so that the structure and the cutting edge rotate together while the cutting tool is rotated to cut the material;
   a recess formed in the structure for rotating with the cutting edge while the cutting tool is rotated to cut the material; and
   a plurality of colored portions located in the recess, wherein the colored portions are located so that they rotate along the same path while the cutting tool is rotated, at least some of the colored portions are different colors that are readily distinguishable from one another while the cutting tool is not being rotated, the colors of the colored portions are selected so that the colored portions form an apparent color that is positioned in the path and apparent while the cutting tool is rotated at greater than a predetermined speed, and the apparent color is different from the colors of the colored portions, whereby the apparent color provides a visual indication that the cutting tool is being rotated.

2. A cutting tool according to claim 1, wherein the structure is a cutterhead, and the cutting edge is part of a blade that is removably mounted in a slot of the cutterhead.

3. A cutting tool according to claim 1, wherein the cutting tool is mounted on a shaft that is for being rotated by a motor about a central axis of the shaft, and the recess is positioned radially outward from the shaft.

4. A cutting tool according to claim 1, wherein the colors of the colored portions consist essentially of red and yellow, so that the apparent color is orange.

5. A cutting tool according to claim 1, wherein the colors of the colored portions are selected from a group consisting of primary colors.

6. A cutting tool according to claim 1, wherein indicia is defined in the recess and moves along the path while the cutting tool is rotated, the indicia is readily discernable while the cutting tool is not being rotated, and the indicia is not readily discernable while the cutting tool is rotated at greater than the predetermined speed.

7. A cutting tool according to claim 6, wherein the indicia is defined by at least one of the colored portions.

8. A cutting tool according to claim 1, wherein the apparent color is a first apparent color, the plurality of colored portions is a first plurality of colored portions, the path is a first path, and further comprising a second plurality of colored portions, wherein the colored portions of the second plurality are positioned on the cutting tool so that they rotate along a second path while the cutting tool is rotated, at least some of the colored portions of the second plurality are different colors that are readily distinguishable from one another while the cutting tool is not being rotated, the colors of the colored portions of the second plurality are selected so the colored portions of the second plurality form a second apparent color that is positioned in the second path and apparent while the cutting tool is rotated at greater than the predetermined speed, the second apparent color is different from the colors of the colored portions of the second plurality, and the second apparent color is different from the first apparent color.

9. A cutting tool according to claim 8, wherein the colors of the colored portions of the second plurality are selected from a group consisting of primary colors.

10. A cutting tool according to claim 1, wherein the cutting tool is a blade.

11. A cutting tool according to claim 10, wherein the structure is a body of the blade that is contiguous with the cutting edge.

12. A cutting tool that is for being mounted on a shaft that is connected to a motor, so that the tool can be rotated, by operating the motor, and used to cut material, the cutting tool comprising:
   at least one cutting edge that rotates while the cutting tool is rotated to cut the material, wherein the cutting edge is positioned radially outward from the shaft; and
   a plurality of colored portions positioned so that the colored portions and the cutting edge rotate together while the cutting tool is rotated to cut the material, wherein the colored portions are positioned radially outward from the shaft while the cutting tool is mounted to the shaft, the colored portions are located so that they move along the same path while the cutting tool is rotated, at least some of the colored portions are different colors that are readily distinguishable from one another while the cutting tool is not being rotated, the colors of the colored portions are selected so that the colored portions form an apparent color that is positioned in the path while the cutting tool is rotated at greater than a predetermined speed, and the apparent color is different from the colors of the colored portions, whereby the apparent color provides a visual indication that the cutting tool is being rotated.

13. A cutting tool according to claim 12, wherein the cutting tool includes a cutterhead and at least one blade connected to the cutterhead, with the blade including the cutting edge.

14. A cutting tool according to claim 12, wherein the colored portions are positioned between the shaft and the cutting edge.

15. A cutting tool according to claim 12, wherein the cutting tool includes a recess and the colored portions are located in the recess.

16. A cutting tool according to claim 12, wherein the colors of the colored portions are selected from a group consisting of primary colors.

17. A cutting tool according to claim 12, wherein at least one of the colored portions includes indicia that moves along the path while the cutting tool is rotated, the indicia is readily discernable while the cutting tool is not being rotated, and the indicia is not readily discernable while the cutting tool is rotated at greater than the predetermined speed.

18. A cutting tool according to claim 12, wherein the apparent color is a first apparent color, the plurality of colored portions is a first plurality of colored portions, the path is a first path, and further comprising a second plurality of colored portions, wherein the colored portions of the second plurality are located so that they move along a second path while the cutting tool is rotated, at least some of the colored portions of the second plurality are different colors that are readily distinguishable from one another while the cutting tool is not being rotated, the colors of the colored portions of the second plurality are selected so the colored portions of the second plurality form a second apparent color that is positioned in the second path and apparent while the cutting tool is rotated at greater than the predetermined speed, the second apparent color is different from the colors of the colored portions of the second plurality, and the second apparent color is different from the first apparent color.

19. A cutterhead for having cutter blades mounted thereto and for being mounted to a shaft of a molding machine so that the cutterhead can be rotated by the molding machine and used by a user to cut material, the cutterhead comprising:

a body having a central axis, a mounting hole extending coaxially with the central axis and between opposite ends of the body, an outer surface extending around the central axis, a plurality of slots that are open at the outer surface and are for respectively receiving the cutter blades, and fasteners for releasably securing the cutter blades in the slots; and a plurality of colored portions on the body and positioned radially outward from the mounting hole, wherein the colored portions are located so that they move along the same path while the cutting tool is rotated by the molding machine, at least some of the colored portions are different colors that are readily distinguishable from one another while the cutterhead is not being rotated, the colors of the colored portions are selected so the colored portions form an apparent color that is positioned in the path and apparent while the cutterhead is rotated at greater than a predetermined speed, and the apparent color is different from the colors of the colored portions, whereby the apparent color provides a visual indication that the cutterhead is being rotated.

20. A cutterhead according to claim 19, wherein the colored portions are located in a recess.

21. A cutterhead according to claim 20, wherein the recess is formed in the body.

22. A cutterhead according to claim 19, wherein the cutterhead is mounted to the molding machine and the cutter blades are respectively mounted in the slots of the cutterhead.

23. A cutterhead according to claim 19, wherein at least one of the colored portions includes indicia that moves along the path while the cutterhead is rotated, the indicia is readily discernable while the cutterhead is not being rotated, and the indicia is not readily discernable while the cutterhead is rotated at greater than the predetermined speed.

24. A cutterhead according to claim 19, wherein the apparent color is a first apparent color, the plurality of colored portions is a first plurality of colored portions, the path is a first path, and further comprising a second plurality of colored portions, wherein the colored portions of the second plurality are positioned on the cutterhead so that they move along a second path while the cutterhead is rotated, at least some of the colored portions of the second plurality are different colors such that they are readily distinguishable from one another while the cutterhead is not being rotated, the colors of the colored portions of the second plurality are selected so the colored portions of the second plurality form a second apparent color that is positioned in the second path and apparent while the cutting tool is rotated at greater than the predetermined speed, the second apparent color is different from the colors of the colored portions of the second plurality, and the second apparent color is different from the first apparent color.

25. A cutterhead according to claim 19, wherein the colors of the colored portions are selected from a group consisting of primary colors.

26. A method of cutting a solid material, comprising:

providing a cutting tool including at least one cutting edge and a plurality of colored portions, wherein at least some of the colored portions are different colors such that they are readily distinguishable from one another while the cutting tool is not being rotated;

mounting the cutting tool onto a shaft that is connected to a motor;

then operating the motor so that the cutting tool rotates above a predetermined speed, so that the colored portions move along the same path and the colors of the colored portions form an apparent color that is positioned in the path and is different from the colors of the colored portions;

contemporaneously viewing the cutting edge and the apparent color in the path during the operating; and cutting the solid material by engaging the solid material against the cutting edge during the operating.

27. A method according to 26, wherein the cutting includes maintaining a rotational axis of the cutting tool at least substantially stationary while moving the solid material further onto the cutting edge.

\* \* \* \* \*